(12) United States Patent
Yamashita (10) Patent No.: US 9,760,774 B2
(45) Date of Patent: Sep. 12, 2017

(54) LINE-OF-SIGHT DETECTION APPARATUS (71) Applicant: Alps Electric Co., Ltd., Tokyo (JP)

(72) Inventor: Tatsumaro Yamashita, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 195 days.

(21) Appl. No.: 14/799,193

(22) Filed: Jul. 14, 2015

(65) Prior Publication Data
US 2016/0063304 A1 Mar. 3, 2016

(30) Foreign Application Priority Data

Aug. 29, 2014 (JP) ................. 2014-176135

(51) Int. Cl.
G06K 9/20 (2006.01)
G06K 9/00 (2006.01)
(52) U.S. Cl.
CPC ......... G06K 9/0061 (2013.01); G06K 9/2018 (2013.01); G06K 9/00248 (2013.01)
(58) Field of Classification Search
None
See application file for complete search history.

(56) References Cited

U.S. PATENT DOCUMENTS

| 2004/0263510 | A1* | 12/2004 | Marschner | ............. G06T 13/40 345/419 |
| 2011/0249868 | A1* | 10/2011 | Tsukizawa | ............. A61B 3/113 382/103 |
| 2013/0188834 | A1 | 7/2013 | Ebisawa | |
| 2015/0339527 | A1* | 11/2015 | Plummer | ........... G06K 9/00597 348/78 |

FOREIGN PATENT DOCUMENTS

JP 2012-055428 A 3/2012

* cited by examiner

Primary Examiner — Eileen Adams
(74) Attorney, Agent, or Firm — Brinks Gilson & Lione (57) ABSTRACT

In computation of a line-of-sight direction in a control unit, a first computed line-of-sight direction is obtained from the center of a pupil and a reflection point of cornea reflection light, a second computed line-of-sight direction is obtained by computing the ellipse shape of an iris or the pupil, and a third computed line-of-sight direction is obtained on the basis of a face orientation and the relative position of the iris or pupil in an eye. The line-of-sight direction can be computed over a wide range with high accuracy by selecting one of the computed line-of-sight directions.

5 Claims, 7 Drawing Sheets

LINE-OF-SIGHT DETECTION APPARATUS

CLAIM OF PRIORITY

This application claims benefit of priority to Japanese Patent Application No. 2014-176135 filed on Aug. 29, 2014, which is hereby incorporated by reference in its entirety.

BACKGROUND

1. Field of the Disclosure

The present disclosure relates to line-of-sight detection apparatuses that can detect a line-of-sight direction of the driver of a vehicle or a target person other than the driver.

2. Description of the Related Art

In the gaze point detection method disclosed in International Publication No. 2012/020760, two cameras are arranged so as to face an eye of a target person. Two types of light source are arranged around each camera in such a manner as to form two concentric circles. Light sources that radiate light having a center wavelength of 850 nm are arranged along the inner circle nearer to the camera and light sources that radiate light having a center frequency of 950 nm are arranged along the outer circle. The camera can obtain a bright pupil image radiating the 850 nm light, and can obtain a dark pupil image by radiating the 950 nm light.

With this gaze point detection method, a pupil image is obtained on the basis of the bright pupil image and dark pupil image, and a cornea reflection point for the light source is obtained from the dark pupil image. On the basis of these images, vectors from the cornea reflection point of the target person to the pupil in planes perpendicular to reference lines connecting the cameras to the cornea are calculated, and the line-of-sight directions of the target person with respect to the reference lines of the respective cameras are calculated on the basis of these vectors by using a predetermined function.

Japanese Unexamined Patent Application Publication No. 2012-55428 discloses an arrangement in which the line-of-sight direction of a target person is detected by using two detection means. The first detection means detects the line-of-sight direction on the basis of the position of a pupil image and the position of the cornea reflection image of the light from a light source. The second detection means detects the line-of-sight direction on the basis of the position of the pupil image and the position of a predetermined portion of a face image that does not include the cornea reflection image. It is stated in the disclosure of Japanese Unexamined Patent Application Publication No. 2012-55428 that, as the function of the second detection means, the line-of-sight direction is detected on the basis of the relationship between the position of an inner eye corner and the position of the pupil image by detecting the position of the inner eye corner by using an inner-eye-corner detection unit.

When the difference between the line-of-sight direction detected by the first detection means and the line-of-sight direction detected by the second detection means is less than a predetermined value, the line-of-sight direction detected by the first detection means is output as a detected direction and when the difference is greater than or equal to the predetermined value, the line-of-sight direction detected by the second detection means is output as a detected direction.

It is an object of the invention disclosed in Japanese Unexamined Patent Application Publication No. 2012-55428 to increase the reliability of the detection of a line-of-sight direction by using the line-of-sight direction detected by the second detection means when the first detection means cannot appropriately detect the cornea reflection image due to, for example, the influence of external light.

The gaze point detection method disclosed in International Publication No. 2012/020760 detects the cornea reflection point of a light source mainly on the basis of a dark pupil image. This cornea reflection point can be easily detected when the irradiation point irradiated with the light from the light source is located within the iris. However, when the inclination angle of the direction of a line of sight with respect to the optical axis of the light source becomes large, the irradiation point of the light is offset from the iris, whereby it becomes difficult to detect the cornea reflection point. Hence, detection based on the gaze point detection method is limited to the case in which the line-of-sight direction is within an angle range of about ±30 degrees with respect to the reference line described above, and in the case where the line-of-sight direction is deviated from the reference line by an angle larger than the above angle, the gaze point cannot be detected.

Japanese Unexamined Patent Application Publication No. 2012-55428 discloses the arrangement in which the line-of-sight direction is detected by using two detection means. However, the objective of using two detection means is to use a detected direction detected by the second detection means, thereby complementing the detection of the line-of-sight direction and enhancing reliability, when a cornea reflection image becomes undetectable in the first detection means due to, for example, external light. The objective is not to allow a line-of-sight direction to be detected even when the line of sight is considerably deviated from the front.

In view of the problems described above, the present invention provides a line-of-sight detection apparatus that can detect a line of sight over a wide angle by computing line-of-sight directions based on a plurality of portions of a face from the images of a face obtained by a camera, and by selecting one of a plurality of computed line-of-sight directions.

SUMMARY

A line-of-sight detection apparatus includes: a plurality of light sources configured to radiate detection light to a face of a target person; a camera configured to capture an image of the face of the target person, a control unit configured to compute a line-of-sight direction on a basis of the image captured by the camera.

The control unit performs: an extraction step of extracting partial images of respective different portions of the face on the basis of the image captured by the camera; a computation step of computing line-of-sight directions on a basis of the respective partial images; and a selection step of selecting one of a plurality of computed line-of-sight directions that are obtained in different ways and from different partial images, in accordance with angle ranges of the line-of-sight directions.

A second embodiment is a line-of-sight detection apparatus includes: a plurality of light sources configured to radiate detection light to a face of a target person; a camera configured to capture the image of a face of the target person; and a control unit configured to compute a line-of-sight direction on a basis of the image captured by the camera.

The control unit performs: an extraction step of extracting partial images of respective different portions of the face on the basis of the image captured by the camera; a computation step of computing line-of-sight directions on a basis of the respective partial images; and a selection step of selecting, from among a plurality of computed line-of-sight directions that are obtained in different ways and from different partial images, one having a small variation as a correct computed line-of-sight direction.

DESCRIPTION OF THE EXEMPLARY EMBODIMENTS

Hereinafter, a line-of-sight detection apparatus according to an embodiment of the present invention will be described in detail with reference to the drawings.

Structure of Line-of-Sight Detection Apparatus

Figure 1A:
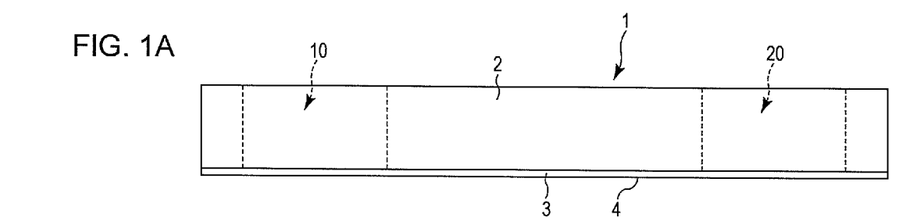
FIG. 1A is a plan view of a line-of-sight detection apparatus according to an embodiment of the present invention and FIG. 1B is a front view thereof.
Figure 1B:
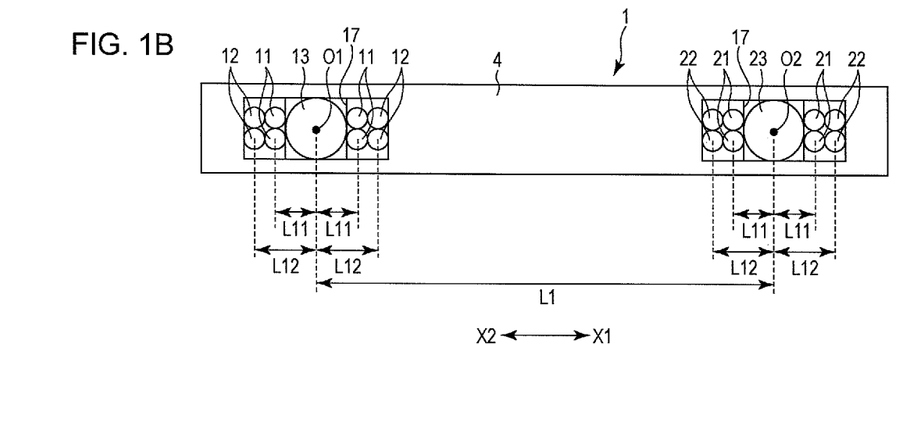

Referring to FIGS. 1A and 1B, a line-of-sight detection apparatus 1 of an embodiment of the present invention includes a case 2. The case 2 is substantially shaped like a rectangular parallelepiped, which is long in the left-right direction and has an opening portion 3 at the front. The opening portion 3 is substantially shaped like a rectangle, and the opening portion 3 is covered with a cover board 4. The cover board 4 is colored in such a manner as to allow infrared light to pass therethrough but lower the light permeability coefficient for the wavelength band of visible light. Alternatively, a configuration may be employed in which the cover board 4 is light-transparent and a colored sheet that lowers the light permeability coefficient is stacked on the cover board 4. Hence, in FIG. 1B, an internal structure within the case 2 cannot actually be seen through the cover board 4. A first image receiving apparatus 10 and a second image receiving apparatus 20 are housed within the case 2.

Referring to FIGS. 1A and 1B, an optical axis O1 of a first camera 13 provided in the first image receiving apparatus 10 and an optical axis O2 of a camera 23 provided in the second image receiving apparatus 20 are arranged in such a manner as to be spaced apart from each other by a predetermined distance L1. The cameras 13 and 23 include an image capture device such as a complementary metal oxide semiconductor (CMOS) device or a charge coupled device (CCD), and capture images of, for example, the driver's face so as to include the eyes of the driver. Light is detected by a plurality of pixels arranged in two dimensions in the image capture device.

Referring to FIGS. 1A and 1B, the first image receiving apparatus 10 includes the first camera 13, first light sources 11 and second light sources 12. The plurality (two) of first light sources 11 are arranged in such a manner that the first camera 13 is sandwiched therebetween in the left-right direction (X direction). Similarly, the plurality (two) of second light sources 12 are arranged in such a manner that the first camera 13 is sandwiched therebetween in the left-right direction. The distance in the left-right direction (X direction) between the optical axis O1 of the first camera 13 and the optical axes of the first light sources 11 on the left and right sides of the first camera 13 is L11 and the distance in the left-right direction (X direction) between the optical axis O1 of the first camera 13 and the optical axes of the second light sources 12 on the left and right sides of the first camera 13 is L12.

The second image receiving apparatus 20 includes the second camera 23, first light sources 21, and second light sources 22. The plurality (two) of first light sources 21 are arranged in such a manner that the second camera 23 is sandwiched therebetween in the left-right direction. The distance between the optical axis O2 of the second camera 23 and the optical axes of the first light sources 21 on the left and right sides is L11. The plurality (two) of second light sources 22 are arranged in such a manner that the second camera 23 is sandwiched therebetween in the left-right direction. The distance between the optical axis O2 of the second camera 23 and the optical axes of the second light sources 22 on the left and right sides is L12.

In the first image receiving apparatus 10, the distance L11 between the first light sources 11 and the optical axis O1 of the first camera 13 is smaller than the distance L12 between the second light sources 12 and the optical axis O1 of the first camera 13. Similarly, in the second image receiving apparatus 20, the distance L11 between the first light sources 21 and the optical axis O2 of the second camera 23 is smaller than the distance L12 between the second light sources 22 and the optical axis O2 of the second camera 23.

Here, the distance L11 between the optical axis of the first camera 13 and the optical axes of the first light sources 11 and the distance L12 between the optical axis of the first camera 13 and the optical axes of the second light sources 12 are sufficiently small compared with the distance L1 between the first camera 13 and the second camera 23, in consideration of the distance between the line-of-sight detection apparatus 1 and the driver as a target person. Hence, the optical axes of the first light sources 11 and the optical axes of the second light sources 12 can be considered to be substantially coaxial with the optical axis of the first camera 13. Similarly, since the distance L11 between the optical axis of the second camera 23 and the optical axes of the first light sources 21 and the distance L12 between the optical axis of the second camera 23 and the optical axes of the second light sources 22 are sufficiently small compared with the distance L1 between the optical axis of the first camera 13 and the optical axis of the second camera 23, the optical axes of the first light sources 21 and the optical axes of the second light sources 22 are considered to be substantially coaxial with the optical axis of the second camera 23.

On the other hand, the distance L1 between the optical axis of the first camera 13 and the optical axis of the second camera 23 is sufficiently large and, hence, the optical axes of the first light sources 11, the second light sources 12, and the first camera 13 in the first image receiving apparatus 10 are not substantially coaxial with the optical axes of the first light sources 21, the second light sources 22, and the second camera 23 in the second image receiving apparatus 20.

The first light sources 11 and 21, which are LED light sources, radiate infrared light having a wavelength of 850 nm (first wavelength) as detection light and are arranged in such a manner as to be capable of irradiating an eye of a target person with this detection light. The second light sources 12 and 22, which are also LED light sources, radiate infrared light having a wavelength of 940 nm (second wavelength) as detection light and are arranged in such a manner as to be capable of irradiating the eye of the target person with this detection light.

The 850 nm wavelength has a low absorption ratio inside an eyeball of a person and, hence, light having this wavelength is likely to be reflected by the retina, and the 940 nm wavelength has a high absorption ratio inside an eyeball of a person and, hence, light having this wavelength is unlikely to be reflected by the retina.

Figure 2A:
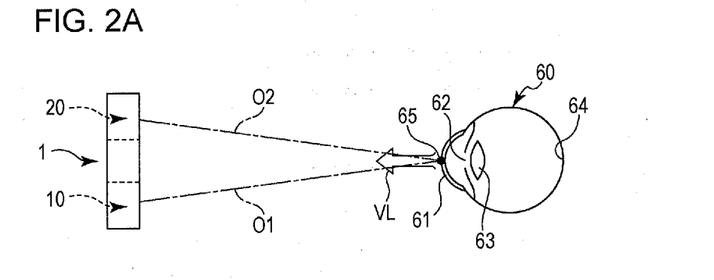
FIGS. 2A and 2B are schematic diagrams for explaining the positional relationship between the line-of-sight detection apparatus and an eye of a target person.
Figure 2B:
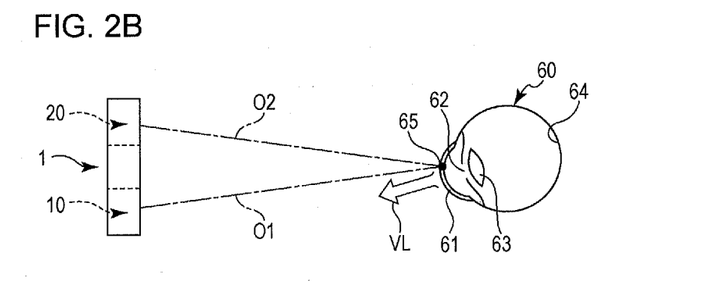

Referring to FIGS. 2A and 2B, the optical axis O1 of the first camera 13 and the optical axis of the first light sources 11 and the second light sources 12 of the first image receiving apparatus 10, and the optical axis O2 of the second camera 23 and the optical axes of the first light sources 21 and the second light sources 22 of the second image receiving apparatus 20, are directed toward the face and an eye of a person.

Figure 6:
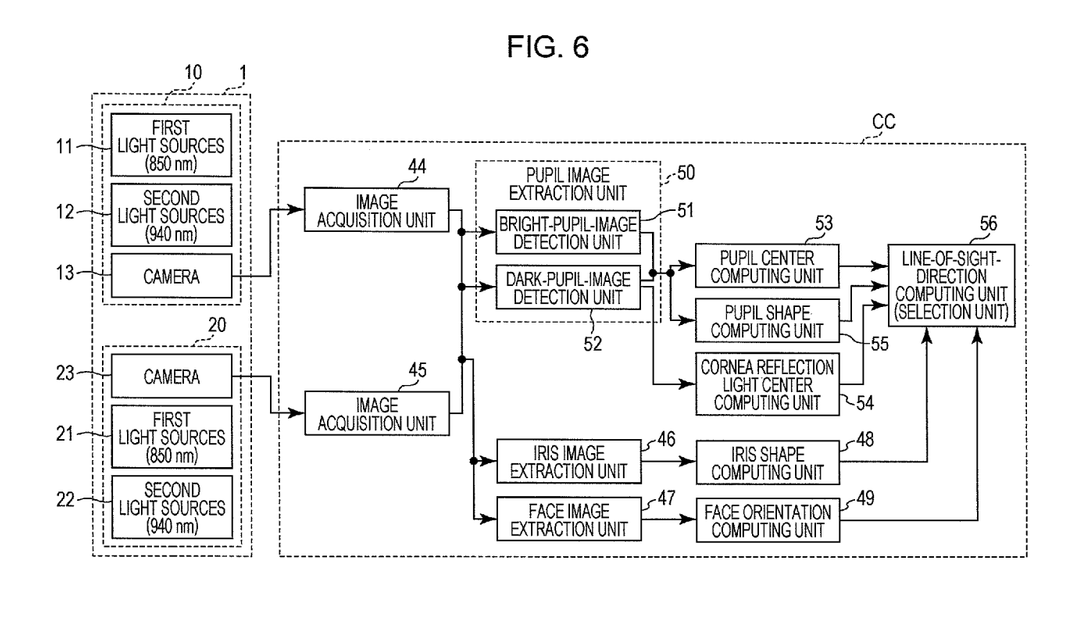
FIG. 6 is a circuit block diagram illustrating the configuration of the line-of-sight detection apparatus according to the embodiment.

An arithmetic control unit CC illustrated in FIG. 6 is formed of the CPU and memory of a computer, and the operations for the functions of the blocks are performed as a result of software installed in advance being executed.

The arithmetic control unit CC includes image acquisition units 44 and 45. Images captured by the first camera 13 and the second camera 23 are supplied frame by frame to image acquisition units 44 and 45, whereby the stereo image of the face of a person is acquired. The image of the face of a person acquired by the image acquisition units 44 and 45 are extracted by a pupil image extraction unit 50, an iris image extraction unit 46, and a face image extraction unit 47 frame by frame.

In the pupil image extraction unit 50, a bright pupil image is detected by a bright-pupil-image detection unit 51, a dark pupil image is detected by a dark-pupil-image detection unit 52, and a pupil image is obtained from the bright pupil image and the dark pupil image. The pupil image is provided to a pupil center computing unit 53, where a pupil center is computed. The dark pupil image is provided to a cornea-reflection-light-center computing unit 54, where the cornea reflection center is computed. Further, the pupil image is provided to a pupil shape computing unit 55, where the shape of a pupil (for example, the ratio of the long-axis length to the short-axis length of an ellipse) is computed.

In the iris image extraction unit 46, an iris image is extracted. This iris image is provided to an iris shape computing unit 48, where the shape of the iris image (for example, the ratio of the long-axis length to the short-axis length of an ellipse) is computed. In the face image extraction unit 47, the positions of the portions of a face are detected. In a face orientation computing unit 49, the orientation of a face is computed. The respective computed values computed by the pupil center computing unit 53, the cornea-reflection-light-center computing unit 54, the pupil shape computing unit 55, the iris shape computing unit 48, and the face orientation computing unit 49 are provided to a line-of-sight-direction computing unit 56.

In the line-of-sight-direction computing unit 56, line-of-sight directions are computed from the computed values, and it is determined which one is selectively used among the plurality of kinds of computed line-of-sight directions.

First Computed Line-of-Sight Direction (Pupil Image and Cornea Reflection Light)

FIGS. 2A and 2B are explanation diagrams schematically illustrating the relationship between the line-of-sight direction of an eye 60 of a target person and the optical axes O1 and O2 of the respective cameras 13 and 23. The optical axis O1 of the first camera 13 and the optical axes of the light sources in the first image receiving apparatus 10 are oriented in such a manner as to be diagonal to the cover board 4. Also in the second image receiving apparatus 20, the optical axis O2 of the second camera 23 and the optical axes of the light sources are oriented in such a manner as to be diagonal to the cover board 4. Hence, both of the optical axis O1 of the first camera 13 and the optical axis O2 of the second camera 23 are directed toward the eye 60 of a target person who is spaced apart from the line-of-sight detection apparatus 1 by a predetermined distance.

Figure 3A:
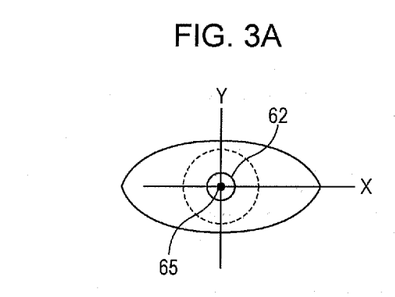
FIGS. 3A and 3B are diagrams for explaining how to obtain a first computed direction in line-of-sight detection.
Figure 3B:
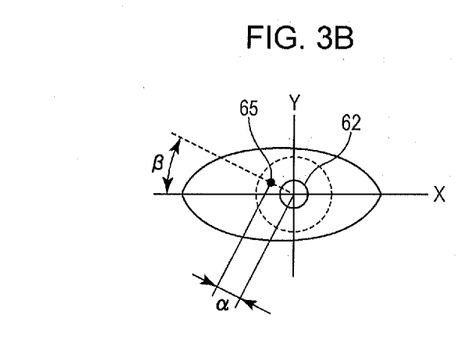

FIGS. 3A and 3B are diagrams for explaining how to compute the direction of a line-of-sight on the basis of the pupil center and the center of cornea reflection light. In FIG. 2A and FIG. 3A, a line-of-sight direction VL of a target person lies between the directions of the optical axis O1 of the first camera 13 and the optical axis O2 of the second camera 23. In FIG. 2B and FIG. 3B, the line-of-sight direction VL is the same as the direction of the optical axis O1 of the first camera 13.

The eye 60 has a cornea 61 at the front, and a pupil 62 and a crystalline lens 63 are located behind the cornea 61. The retina 64 is located at the back.

The images of a face captured by the cameras 13 and 23 are acquired by the image acquisition units 44 and 45, and the pupil image extraction unit 50 acquires the images of an eye portion as partial images. At this time, partial images having different brightnesses of the pupil 62 are acquired by selecting a light source to be lit. A difference in the brightness of the pupil 62 in the partial images is conceptually represented by a bright pupil image and a dark pupil image. When two images are compared, one in which the pupil 62 is bright is a bright pupil image, and the other in which the pupil 62 is dark is a dark pupil image.

The bright pupil image and the dark pupil image are obtained by switching between illumination by the first light sources 11 and 21 and illumination by the second light sources 12 and 22.

The light of the first light sources 11 and 21 having a wavelength of 850 nm has a low absorption ratio inside an eye ball and is likely to be reflected by a retina. Hence, when the first light sources 11 of the first image receiving apparatus 10 are lit, infrared light reflected by a retina 64 is detected through the pupil 62, whereby the pupil 62 looks bright in the image captured by the first camera 13 substantially coaxial with the first light sources 11. This image is extracted by the bright-pupil-image detection unit 51 as a bright pupil image. This is substantially the same with an image, which is acquired by the second camera 23, substantially coaxial with the first light sources 21 when the first light sources 21 are lit, in the second image receiving apparatus 20.

The light of the second light sources 12 and 22 having a wavelength of 940 nm has a high absorption ratio inside an eye ball and is unlikely to be reflected by a retina. Hence, when the second light sources 12 of the first image receiving apparatus 10 are lit, infrared light is negligibly reflected by the retina 64, whereby the pupil 62 looks dark in the image captured by the first camera 13 substantially coaxial with the second light sources 12. This image is extracted by the dark-pupil-image detection unit 52 as a dark pupil image. This is substantially the same with an image, which is acquired by the second camera 23, substantially coaxial with the second light sources 22 when the second light sources 22 are lit, in the second image receiving apparatus 20.

By repeating the image capturing operations by alternately using the first image receiving apparatus 10 and the second image receiving apparatus 20, the bright pupil images as well as the dark pupil images can be captured separately by the cameras 13 and 23, whereby the three-dimensional position of the pupil can be measured.

Alternatively, a bright pupil image and a dark pupil image can be acquired by switching the light sources as follows.

Referring to FIG. 2A, the optical axis O1 of the first image receiving apparatus 10 and the optical axis O2 of the second image receiving apparatus 20 have different angles with respect to the eye 60.

When the first light sources 11 mounted on the first image receiving apparatus 10 are lit, an image captured by the first camera 13 substantially coaxial with the first light sources 11 is a bright pupil image in which the pupil 62 looks bright since infrared light reflected by the retina 64 is likely to enter the first camera 13. This image is extracted by the bright-pupil-image detection unit 51 as a bright pupil image. On the other hand, the optical axis O2 of the second camera 23 provided in the second image receiving apparatus 20 is not coaxial with the optical axis of the first light sources 11 of the first image receiving apparatus 10. Hence, when the first light sources 11 are lit, even if the light is reflected by the retina 64, the light is unlikely to be detected by the second camera 23. As a result, an image captured by the second camera 23 is a dark pupil image in which the pupil 62 is comparatively dark. This image is extracted by the dark-pupil-image detection unit 52 as a dark pupil image.

On the contrary, when the first light sources 21 of the second image receiving apparatus 20 are lit, light reflected by the retina 64 passes through the pupil 62 along the optical axis O2 and is likely to be detected by the second camera 23, whereby an image captured by the second camera 23 is a bright pupil image. At this time, light reflected by the retina 64 is unlikely to be detected by the first camera 13 located diagonally in front of the eye, the image captured by the first camera 13 is a dark pupil image.

In other words, when detection light having the same wavelength is radiated, an image acquired from a camera close to the light source is a bright pupil image and an image acquired from a camera remote from the light source is a dark pupil image.

This is also the case in the combination of the cameras 13 and 23 with the second light sources 12 of the first image receiving apparatus 10 and the second light sources 22 of the second image receiving apparatus 20.

In the pupil image extraction unit 50 illustrated in FIG. 6, a dark pupil image detected by the dark-pupil-image detection unit 52 is subtracted from a bright pupil image detected by the bright-pupil-image detection unit 51. With this calculation, the image of the pupil 62, which looks bright in the bright pupil image, remains and the images of other portions substantially disappear because they cancel each other out.

A pupil image signal showing the shape of the pupil 62 is provided to the pupil center computing unit 53. In the pupil center computing unit 53, the pupil image signal is converted into a binary signal through image processing, and an area image of a portion corresponding to the shape and area of the pupil 62 is computed. Further, an ellipse including this area image is extracted and the intersecting point between the long axis and the short axis of the ellipse is computed as the center position of the pupil 62.

Next, when any one of the light sources is lit, light radiated from the light source is reflected at the surface of the cornea 61, and the reflected light is captured by both of the first camera 13 and the second camera 23, and detected by the bright-pupil-image detection unit 51 and the dark-pupil-image detection unit 52. In the dark-pupil-image detection unit 52, in particular, since the image of the pupil 62 is comparatively dark, reflection light reflected from a reflection point 65 of the cornea 61 can easily be detected as a bright spot image.

A dark pupil image signal detected by the dark-pupil-image detection unit 52 is provided to the cornea-reflection-light-center computing unit 54. The dark pupil image signal includes a brightness signal based on the reflection light reflected from the reflection point 65 of the cornea 61. The reflection light reflected from the reflection point 65 of the cornea 61 forms a Purkinje image, which is captured by each of the image capturing devices of the cameras 13 and 23 as a spot image having an extremely small area, as illustrated in FIGS. 3A and 3B. The spot image is subjected to image processing performed by the cornea-reflection-light-center computing unit 54, and the center of the reflection light reflected from the reflection point 65 of the cornea 61 is obtained.

The computed pupil center computed by the pupil center computing unit 53 and the computed cornea-reflection-light-center computed by the cornea-reflection-light-center computing unit 54 are provided to the line-of-sight-direction computing unit 56. In the line-of-sight-direction computing unit 56, the direction of the line of sight is detected on the basis of the computed pupil center and the computed cornea reflection light center.

In FIG. 2A, the line-of-sight direction VL of the eye 60 of a person is an intermediate direction between the directions of the optical axis O1 of the first camera 13 and the optical axis O2 of the second camera 23. At this time, the center of the reflection point 65 at the cornea 61 coincides with the center of the pupil 62, as illustrated in FIG. 2A. On the other hand, in FIG. 2B, the line-of-sight direction VL of the eye 60 of a person is directed considerably toward the left side. At this time, the center of the pupil 62 and the center of the reflection point 65 at the cornea 61 are displaced from each other, as illustrated in FIG. 3B.

In the line-of-sight-direction computing unit 56, a distance α in a straight line between the center of the pupil 62 and the center of the reflection point 65 at the cornea 61 is computed (FIG. 3B). Further, X-Y coordinates with the origin at the center of the pupil 62 are set and an inclination angle β between the X-axis and a line connecting the center of the pupil 62 and the reflection point 65 to each other. The line-of-sight direction VL can be computed as a result of the distance α in a straight line and the inclination angle β being computed on the basis of the images captured by the two cameras 13 and 23. In this manner, the computed line-of-sight direction computed from the center of the pupil 62 and the center of the reflection point 65 at the cornea 61 may be a first computed line-of-sight direction.

Second Computed Line-of-Sight Direction (Shape of Pupil or Iris)

In the arithmetic control unit CC illustrated in FIG. 6, the image of an iris is extracted in the iris image extraction unit 46 from images acquired by the image acquisition units 44 and 45 as a partial image and provided to the iris shape computing unit 48. Alternatively, a configuration may be employed in which the image of an iris is extracted from a bright pupil image detected by the bright-pupil-image detection unit 51 or from a dark pupil image detected by the dark-pupil-image detection unit 52 and is provided to the iris shape computing unit 48. In the iris shape computing unit 48, an area image corresponding to the iris image is created and the lengths of the long axis and short axis of an eclipse of the area image are computed. The ratio of the lengths of the long axis and short axis is provided to the line-of-sight-direction computing unit 56, where computation is performed to determine what kind of ellipse the iris is shaped like. Further, the inclination angle of the iris in the upward/downward direction in the space can also be computed on the basis of the inclination of the long axis or short axis.

Figure 4A:
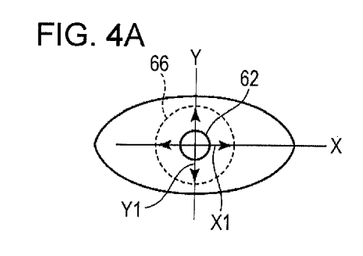
FIGS. 4A, 4B, 4C, and 4D are diagrams for explaining how to obtain a second computed direction in line-of-sight detection on the basis of the shape of an iris or the shape of a pupil.

The image of an eye illustrated in FIG. 4A is the same as the one illustrated in FIG. 3A, where the line-of-sight direction VL is a direction between the optical axis O1 of the first camera 13 and the optical axis O2 of the second camera 23. Assuming that the length of the image of an iris 66 in the vertical axis (Y axis) is a long-axis length Y1 and the length of the image in the horizontal axis (X axis) is a short-axis length X1, it is determined that the line-of-sight direction VL is approximately directed toward the front when the ratio of the long-axis length Y1 to the short-axis length X1 becomes the smallest (close to 1).

Figure 4B:
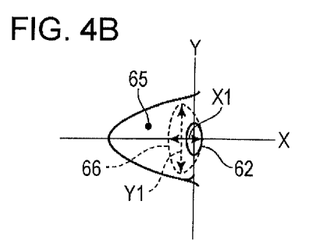

In FIG. 4B, the line-of-sight direction VL is directed further toward the left direction (direction exceeding the optical axis O1) than the direction in FIG. 2B. The angle of the line-of-sight direction VL at this time can be obtained from the ratio of the long-axis length Y1 to the short-axis length X1 of the image of the iris. In FIG. 4B, the reflection point 65 at the cornea 61 used for the first computed line-of-sight direction is outside of the iris 66 and, hence, it is difficult to extract the reflection point 65 from the dark pupil image, and the first computed line-of-sight direction to be computed from the center of the pupil 62 and the center of the reflection point 65 at the cornea 61 is not obtained. Even when the first computed line-of-sight direction is obtained, the variation thereof is large.

On the other hand, the long-axis length Y1 and the short-axis length X1 of the iris 66 are extracted in a comparatively stable manner. The ratio of the long-axis length Y1 to the short-axis length X1 is obtained in the iris shape computing unit 48 and the long-axis length Y1 and the short-axis length X1 are provided to the line-of-sight-direction computing unit 56, whereby the angle of the line-of-sight direction can be computed in a comparatively stable manner.

Figure 4C:
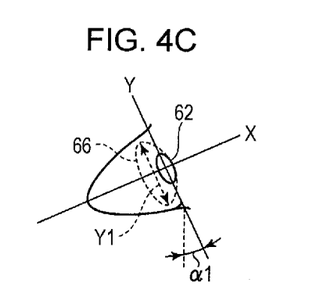
Figure 4D:
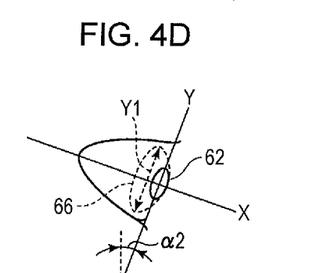

In FIG. 4C, the line-of-sight direction VL is the same as that in FIG. 4B and at the same time is an upward direction. In FIG. 4D, the line-of-sight direction VL is the same as that in FIG. 4B and at the same time is a downward direction. In the iris shape computing unit 48, angles $\alpha 1$ and $\alpha 2$ between the long axis Y and the vertical axis are computed and the computed values are provided to the line-of-sight-direction computing unit 56. In the line-of-sight-direction computing unit 56, it can also be determined whether the direction of the line-of-sight is directed upward or downward on the basis of the angles $\alpha 1$ and $\alpha 2$.

The pupil image extracted by the pupil image extraction unit 50 illustrated in FIG. 6 is provided to the pupil shape computing unit 55. In the pupil shape computing unit 55, computation similar to that in the iris shape computing unit 48 is performed, the ratio of the long-axis length of the pupil 62 to the short-axis length of the pupil 62 is obtained, and, further, an inclination angle between the long axis and the vertical axis is computed. The ratio of the long-axis length to the short-axis length and the inclination angle are provided to the line-of-sight-direction computing unit 56, where the line-of-sight direction is computed.

In the line-of-sight-direction computing unit 56, only one of the computed line-of-sight direction computed from the shape of an iris and the computed line-of-sight direction computed from the shape of a pupil may be used as the second computed line-of-sight direction, or one, with a smaller variation, of the computed line-of-sight direction computed from the shape of an iris and the computed line-of-sight direction computed from the shape of a pupil may be used as the second computed line-of-sight direction.

Third Computed Line-of-Sight Direction (Orientation of Face and Position of Iris)

Figure 5A:
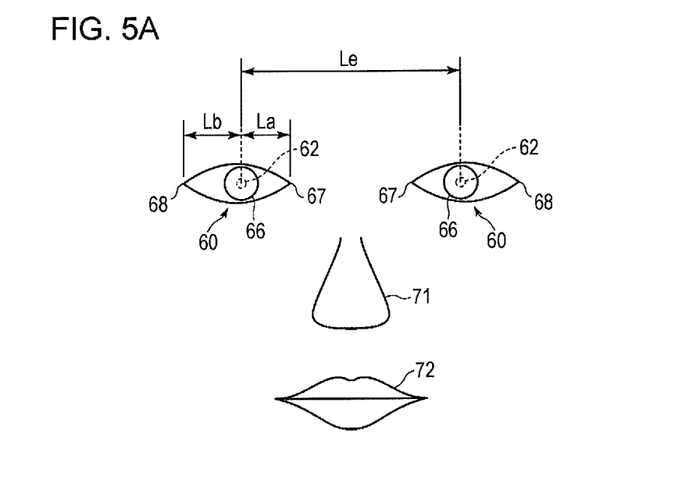
FIGS. 5A and 5B are diagrams for explaining how to obtain a third computed direction in line-of-sight detection on the basis of the orientation of a face and the position of an iris.
Figure 5B:
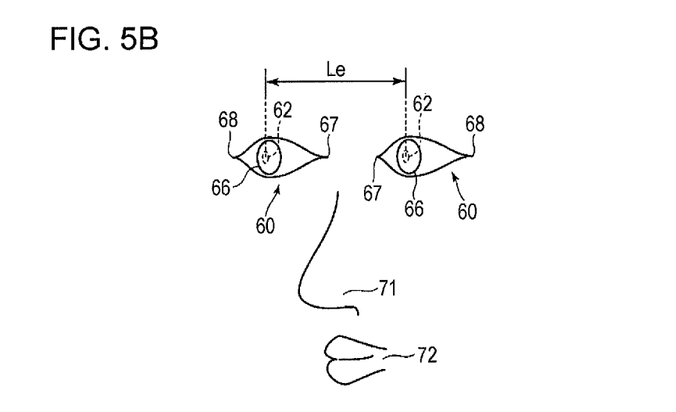

FIG. 5A is an image illustrating the orientation of a face and the positions of the irises 66 and the pupils 62, when the face is facing the front, and FIG. 5B is an image illustrating the orientation of a face and the positions of the irises 66 or the pupils 62 when the line-of-sight direction is considerably deviated from the forward direction.

Referring to FIG. 6, in the face image extraction unit 47, partial images of the portions of a face are extracted from the images of the face acquired by the image acquisition units 44 and 45. For example, the two ends of lips 72 or the two sides of a nose 71 illustrated in FIGS. 5A and 5B are detected. This detection is performed by, for example, searching for portions of an image with high degree of change in brightness. The face orientation computing unit 49 computes the relative relationship among the positions of the images of portions, such as the positions of the lips 72, the position of the nose 71, and the positions of the eyes 60, and computes the orientation of the face on the basis of the computed values.

Another method of computing the orientation of a face is as follows. Since the images of the two pupils 62 have been acquired by the pupil image extraction unit 50, in the line-of-sight-direction computing unit 56, by measuring a distance Le between the two pupils 62 and 62, the orientation of the face can be computed on the basis of a change in the distance Le. With the computing method of computing the orientation of a face by using a change in the distance Le between the pupils, the output of the pupil center computing unit 53 can be utilized as it is and, hence, the orientation of the face can be computed without performing complex image processing.

Next, an inner eye corner 67 and an outer eye corner 68 are detected in the face image extraction unit 47. This detection is performed, for example, by detecting a position where a change in brightness is at a predetermined level or higher through image processing. Since the iris 66 is detected by the iris image extraction unit 46, the position of the iris 66 in the eye 60 can be computed by comparing a distance La between the inner eye corner 67 and the center of the iris 66 and a distance Lb between the outer eye corner 68 and the center of the iris 66.

Alternatively, since the image of the pupil 62 has been detected in the pupil image extraction unit 50, the center position of the iris 66 (pupil-center position) in the eye 60 can be computed by comparing the distance La between the inner eye corner 67 and the center of the pupil 62 and the distance Lb between the outer eye corner 68 and the center of the pupil 62.

In the line-of-sight-direction computing unit 56, the line-of-sight direction can be computed from the computed values regarding the orientation of a face and the relative position of the center of the iris 66 (pupil center) in the eye 60 even when the line-of-sight direction is considerably deviated horizontally from the forward direction. This computed result is a third computed line-of-sight direction.

The arrangement of the portions of a face, the distance Le between the pupils 62, and the like illustrated in FIGS. 5A and 5B change in accordance with an individual target person. Hence, it is preferable to compute the orientation of a face by, for example, first acquiring the basic image of the face through operation of an operation button after making the face direction and the line-of-sight direction be the same as the forward direction (intermediate direction between the optical axis O1 and the optical axis O2), secondly making the positions at which the portions of the face are arranged in the basic image be references, and then extracting the positions of the images of the portions of the face, on the basis of the arrangement of the portions in the basic image.

In the manner in which a line-of-sight direction is obtained from the orientation of a face and the position of an iris (or a pupil), even in the case of the line-of-sight direction that does not allow the reflection point 65 of cornea reflection light to be detected, that is, even when the line-of-sight direction is a direction that does not allow the first computed line-of-sight direction to be obtained, the line-of-sight direction can be obtained as a third computed line-of-sight direction.

Selection of Computed Line-of-Sight Direction

Figure 7:
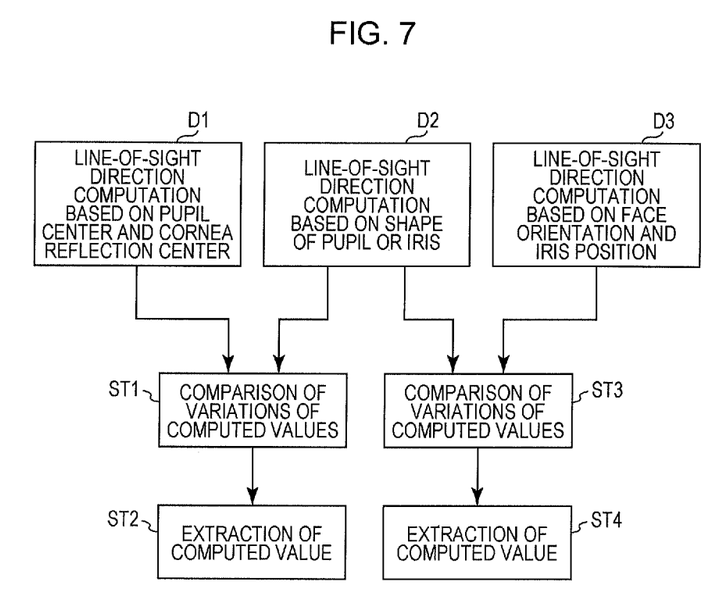
FIG. 7 is a flowchart illustrating the control operation from acquisition of an image to detection of a line-of-sight direction.

FIG. 7 illustrates a selection process of selecting a computed line-of-sight direction performed in the line-of-sight-direction computing unit 56. In the line-of-sight-direction computing unit 56, a first computed line-of-sight direction D1 of the line-of-sight direction is obtained from the center of the pupil 62 illustrated in FIGS. 3A and 3B and the reflection point 65 of cornea reflection light, a second computed line-of-sight direction D2 of the line-of-sight direction is obtained by computing the ellipse shape of the iris 66 or the pupil 62 illustrated in FIGS. 4A to 4D, and a third computed line-of-sight direction D3 of the line-of-sight direction is obtained from the orientation of a face and the relative positions of the irises 66 or the pupils 62 in the eyes 60 illustrated in FIGS. 5A and 5B.

In a first selection method of selecting a computed line-of-sight direction, a computed line-of-sight direction is selected on the basis of a computed angle range.

The first computed line-of-sight direction D1 is selected as the correct computed line-of-sight direction when the angle of a line-of-sight direction obtained by the first computed line-of-sight direction D1 is within a first angle range (for example, ±30 degrees) with respect to the forward direction (intermediate direction between the optical axis O1 and the optical axis O2). When the first computed line-of-sight direction D1 has reached the limit of the first angle range, the second computed line-of-sight direction D2 is selected as the correct computed line-of-sight direction. Until the second computed line-of-sight direction D2 exceeds a second angle range (for example, ±60 degrees) which is wider than the first angle range, the second computed line-of-sight direction D2 continues to be selected. When the second computed line-of-sight direction D2 has reached the second angle range, the third computed line-of-sight direction D3 is selected.

As a result of the computed line-of-sight direction being switched from D1 to D2 and then to D3, the angle of a line-of-sight direction can be computed even when the line-of-sight direction significantly deviates from the forward direction and reaches substantially ±90 degrees, exceeding ±60 degrees. Hence, when the driver of a car is a person to be measured, the line-of-sight direction, even when changed so that the driver may look at a left or right side mirror, can be measured.

A second selection method of selecting a computed line-of-sight direction is a method that complements the first selection method.

In the second selection method, the first computed line-of-sight direction D1 is selected when the line-of-sight direction VL is in a range from the forward direction to near a first angle range (for example, ±30 degrees), and the second computed line-of-sight direction D2 is selected when the first angle range has been exceeded. However, in the border area of the first angle range, for example, when the angle of the line-of-sight direction is in a range from 25 to 35 degrees, the processing flow in the line-of-sight-direction computing unit 56 goes to step ST1 in FIG. 7, where the variation of the first computed line-of-sight direction D1 and the variation of the second computed line-of-sight direction D2 are compared with each other. In this comparison, the maximum values of the variations per unit time may be compared with each other, or the average values of the variations per unit time may be compared with each other. Then in step ST2, when the angle of the line-of-sight direction is in a range from 25 to 35 degrees, one of the first computed line-of-sight direction D1 and the second computed line-of-sight direction D2 which has a smaller variation is selected as the correct computed line-of-sight direction. This selection is performed periodically at predetermined time intervals. Hence, in the range from 25 to 35 degrees, the first computed line-of-sight direction D1 and the second computed line-of-sight direction D2 may be swapped with each other at the predetermined time intervals.

When the angle of the line-of-sight direction has exceeded 35 degrees, the second computed line-of-sight direction D2 is selected as the correct computed line-of-sight direction. When the angle of the line-of-sight direction is in the border area of a second angle range, for example in a range from 55 degrees to 65 degrees, the processing flow goes to step ST3 illustrated in FIG. 7, where the variation of the second computed line-of-sight direction D2 and the variation of the third computed line-of-sight direction D3 are compared with each other. In step ST4, in a range from 55 to 65 degrees, one of the second computed line-of-sight direction D2 and the third computed line-of-sight direction D3 which has a smaller variation is selected as the correct computed line-of-sight direction. When an angle of 65 degrees has been exceeded, the third computed line-of-sight direction D3 is selected as the correct detected line-of-sight direction. Note that in a range from 55 degrees to 65 degrees, the comparison is periodically performed at predetermined intervals.

In this second selection method, the angle of the line-of-sight direction can always be obtained with high accuracy also in the border area of the first angle range and the border area of the second angle range.

Next, a third selection method will be described.

Referring to FIGS. 3A and 3B, in the third selection method, when the reflection point 65 at the cornea 61 is detected and the detection output from the cornea-reflection-light-center computing unit 54 has been obtained, or when the first computed line-of-sight direction D1 has been obtained, in step ST1 illustrated in FIG. 7, the variations of the first computed line-of-sight direction D1 and the second, computed line-of-sight direction D2 are compared with each other and the line-of-sight direction with a smaller variation is selected in step ST2 as the correct computed line-of-sight direction.

After that, when the detection output from the cornea-reflection-light-center computing unit 54 becomes unavailable or the first computed line-of-sight direction D1 becomes unavailable, the processing flow goes to step ST3. In step ST3, the variations of the second computed line-of-sight direction D2 and the third computed line-of-sight direction D3 are compared with each other, and one with a smaller variation is selected as the correct detected line-of-sight direction in step ST4.

In this manner, the line-of-sight direction can be computed with high accuracy by always selecting one of computed line-of-sight directions with a smaller variation.

What is claimed is:

1. A line-of-sight detection apparatus comprising:
   a plurality of light sources that radiate detection light to a face of a target person;
   a camera that captures an image of the face of the target person; and
   a control unit that computes a line-of-sight direction on a basis of the image captured by the camera,
   wherein the control unit performs:
   an extraction step of extracting partial images of respective different portions of the face on the basis of the image captured by the camera;
   a computation step of computing line-of-sight directions on a basis of the respective partial images; and
   a selection step of selecting one of a plurality of computed line-of-sight directions that are obtained in different ways and from different partial images, in accordance with angle ranges of the line-of-sight directions and
   wherein:
   the partial images include a pupil image, a cornea reflection light image, and an iris image,
   a first computed line-of-sight direction is obtained from the pupil image and the cornea reflection light image,
   a second computed line-of-sight direction is obtained from a shape of the pupil image or the iris image,
   the first computed line-of-sight direction is selected as a correct computed line-of-sight direction while an angle of the line-of-sight direction with respect to a reference value is within a first angle range, and the second computed line-of-sight direction is selected as the correct computed line-of-sight direction when the angle of the line-of-sight direction has exceeded the first angle range,
   the partial images are the face image and the iris image or are the face image and the pupil image, the face orientation is computed from the face image, a position of the iris in an eye or a position of the pupil in the eye is computed from the iris image or the pupil image, and a third computed line-of-sight direction is computed from the face orientation and the position of the iris or from the face orientation and the position of the pupil, and
   the third computed line-of-sight direction is selected as the correct computed line-of-sight direction when an angle of the line-of-sight direction has exceeded a second angle range which includes larger angles than the first angle range.

2. A line-of-sight detection apparatus comprising:
   a plurality of light sources that radiate detection light to a face of a target person;
   a camera that captures an image of the face of the target person; and
   a control unit that computes a line-of-sight direction on a basis of the image captured by the camera,
   wherein the control unit performs:
   an extraction step of extracting partial images of respective different portions of the face on the basis of the image captured by the camera;
   a computation step of computing line-of-sight directions on a basis of the respective partial images; and
   a selection step of selecting, from among a plurality of computed line-of-sight directions that are obtained in different ways and from different partial images, one having a small variation as a correct computed line-of-sight direction; and
   wherein:
   an angle of the line-of-sight direction is classified into a plurality of angle ranges, and a partial image to be selected to obtain a computed line-of-sight direction is assigned in advance to each angle range, and
   in a border area of an angle range, from among different computed line-of-sight directions used in angle ranges on two sides of the border area, a computed line-of-sight direction having a smaller variation is selected as the correct computed line-of-sight direction.

3. The line-of-sight detection apparatus according to claim 2,
   wherein the partial images include a pupil image, a cornea reflection light image, and an iris image,
   wherein a first computed line-of-sight direction is obtained from the pupil image and the cornea reflection light image,
   wherein a second computed line-of-sight direction is obtained from a shape of the pupil image or the iris image, and
   wherein, one of the first and second computed line-of-sight directions that has a smaller variation is selected as the correct computed line-of-sight direction.

4. The line-of-sight detection apparatus according to claim 3,
   wherein the partial images are the face image and the iris image or are the face image and the pupil image, the face orientation is computed from the face image, a position of the iris in an eye or a position of the pupil in the eye is computed from the iris image or the pupil image, and a third computed line-of-sight direction is computed from the face orientation and the position of the iris or from the face orientation and the position of the pupil, and
   wherein, one of the second and third computed line-of-sight directions that has a smaller variation is selected as the correct computed line-of-sight direction when the first computed line-of-sight direction becomes unavailable.

5. A line-of-sight detection apparatus comprising:
   a plurality of light sources that radiate detection light to a face of a target person;
   a camera that captures an image of the face of the target person; and
   a control unit that computes a line-of-sight direction on a basis of the image captured by the camera,
   wherein the control unit performs:
   an extraction step of extracting partial images of respective different portions of the face on the basis of the image captured by the camera;
   a computation step of computing line-of-sight directions on a basis of the respective partial images; and
   a selection step of selecting, from among a plurality of computed line-of-sight directions that are obtained in different ways and from different partial images, one having a small variation as a correct computed line-of-sight direction; and wherein:
the partial images include a pupil image, a cornea reflection light image, and an iris image,
a first computed line-of-sight direction is obtained from the pupil image and the cornea reflection light image,
a second computed line-of-sight direction is obtained from a shape of the pupil image or the iris image,
one of the first and second computed line-of-sight directions that has a smaller variation is selected as the correct computed line-of-sight direction,
the partial images are the face image and the iris image or are the face image and the pupil image, the face orientation is computed from the face image, a position of the iris in an eye or a position of the pupil in the eye is computed from the iris image or the pupil image, and a third computed line-of-sight direction is computed from the face orientation and the position of the iris or from the face orientation and the position of the pupil, and
one of the second and third computed line-of-sight directions that has a smaller variation is selected as the correct computed line-of-sight direction when the first computed line-of-sight direction becomes unavailable.

* * * * *